(12) United States Patent
Fleischmann et al.

(10) Patent No.: US 9,249,840 B2
(45) Date of Patent: Feb. 2, 2016

(54) DRIVE ASSEMBLY ON A TWIN-CLUTCH TRANSMISSION FOR MOTOR VEHICLES

(75) Inventors: Hans-Peter Fleischmann, Stammham (DE); Rupert Wagner, Kühbach (DE)

(73) Assignee: AUDI AG, Ingolstadt (DE)

( * ) Notice: Subject to any disclaimer, the term of this patent is extended or adjusted under 35 U.S.C. 154(b) by 275 days.

(21) Appl. No.: 13/698,537

(22) PCT Filed: May 18, 2011

(86) PCT No.: PCT/EP2011/002472
§ 371 (c)(1),
(2), (4) Date: Dec. 28, 2012

(87) PCT Pub. No.: WO2011/144329
PCT Pub. Date: Nov. 24, 2011

(65) Prior Publication Data
US 2013/0153356 A1 Jun. 20, 2013

(30) Foreign Application Priority Data

May 19, 2010 (DE) .......................... 10 2010 021 033

(51) Int. Cl.
*F16D 21/06* (2006.01)
*F16D 25/08* (2006.01)
(Continued)

(52) U.S. Cl.
CPC .............. *F16D 21/06* (2013.01); *F16D 25/082* (2013.01); *F16D 25/10* (2013.01);
(Continued)

(58) Field of Classification Search
CPC . F16D 21/02; F16D 21/06; F16D 2021/0661; F16D 25/10; F16D 25/08; F16D 25/082; F16H 57/0037

USPC ............ 192/48.606, 48.602, 48.603, 48.604, 192/48.605, 48.607, 48.609, 48.61, 48.611, 192/48.616, 48.8, 48.9, 85.48
See application file for complete search history.

(56) References Cited

U.S. PATENT DOCUMENTS 794,899 A * 7/1905 Sturtevant ........................ 74/330
2,231,411 A * 2/1941 Lawrence .................... 192/48.7
(Continued)

FOREIGN PATENT DOCUMENTS

CN 1364985 A 8/2002
CN 101031444 A 9/2007
(Continued)

OTHER PUBLICATIONS

International Search Report issued by the European Patent Office in International Application PCT/EP/2011/002472.

*Primary Examiner* — Robert Hodge
*Assistant Examiner* — Ryan Dodd
(74) *Attorney, Agent, or Firm* — Henry M. Feiereisen LLC.

(57) ABSTRACT

The invention relates to a drive assembly on a twin-clutch transmission for motor vehicles, including two clutches which are axially connected in succession in a transmission housing and are positioned between spaced-apart end walls of the transmission housing and which have each a preferably drum-shaped drive element which is driven by an input shaft of the transmission, with the clutches being in driving relationship, preferably alternatingly, via two preferably pot-shaped output elements with two output shafts in coaxial arrangement to the input shafts. According to the invention, the input shaft (14) which is rotatably mounted in the region of a first end wall (12*a*) is guided up to the second end wall (10*a*) located in opposition to the first end wall (12*a*) and is rotatably mounted there indirectly via the output shafts (24, 26) which are also rotatably mounted in the region of the second end wall (10*a*).

16 Claims, 1 Drawing Sheet

(51) Int. Cl.
*F16D 25/10* (2006.01)
*F16H 57/00* (2012.01)
*F16H 3/00* (2006.01)
*F16H 57/021* (2012.01)

(52) U.S. Cl.
CPC ... *F16H 57/0037* (2013.01); *F16D 2021/0661* (2013.01); *F16H 3/006* (2013.01); *F16H 57/021* (2013.01); *Y02T 10/76* (2013.01)

(56) References Cited

U.S. PATENT DOCUMENTS 3,009,553 A * 11/1961 Henyon ................. 192/48.1

| | | |
|---|---|---|
| 2002/0060118 A1 | 5/2002 | Beneton |
| 2007/0175726 A1 | 8/2007 | Combes |
| 2009/0194383 A1 | 8/2009 | Fronius |
| 2010/0072015 A1* | 3/2010 | Toyota et al. ............. 192/3.33 |
| 2010/0320050 A1 | 12/2010 | Fujita |

FOREIGN PATENT DOCUMENTS

| | | |
|---|---|---|
| CN | 101498343 A | 8/2009 |
| DE | 10 2005 027 467 A1 | 12/2006 |
| DE | 10 2006 010 113 A1 | 9/2007 |
| DE | 11 2007 002 842 T5 | 9/2009 |
| DE | 10 2008 040 172 A1 | 1/2010 |
| FR | 1 261 415 A | 4/1960 |

* cited by examiner

DRIVE ASSEMBLY ON A TWIN-CLUTCH TRANSMISSION FOR MOTOR VEHICLES

CROSS-REFERENCES TO RELATED APPLICATIONS

This application is the U.S. National Stage of International Application No. PCT/EP2011/002472, filed May 18, 2011, which designated the United States and has been published as International Publication No. WO 2011/144329 and which claims the priority of German Patent Application, Serial No. 10 2010 021 033.1, filed May 19, 2010, pursuant to 35 U.S.C. 119(a)-(d).

BACKGROUND OF THE INVENTION

The invention relates to a drive assembly on a twin-clutch transmission for motor vehicles according to the preamble of patent claim 1.

A number of proposals for twin-clutch transmissions are known from the patent literature, wherein the two multi-disk clutches are arranged in part radially above one another or also axially behind one another. Both output shafts of the clutches are configured as hollow shafts which are nested within one another, and the rolling bearings, when accessible, are arranged on the end walls of the transmission housing and between the shafts (including the input shaft) for receiving axial and radial loads as well as possibly encountered bending moments.

SUMMARY OF THE INVENTION

It is an object of the invention to propose a drive assembly on a twin-clutch transmission for motor vehicles, which in terms of construction and manufacture provides a beneficial support of the shafts of the twin-clutch transmission and substantially keeps away from the clutch elements any impact that interferes with the clutch function of the multi-disk clutches and enables a comfortable clutch operation.

This object is solved according to the invention by a drive assembly on a twin-clutch transmission for motor vehicles, including two clutches, in particular multi-disk clutches, which are axially connected in succession in a transmission housing and are positioned between spaced-apart end walls of the transmission housing and which have each a preferably drum-shaped drive element which is driven by an input shaft of the transmission, with the clutches being in driving relationship, preferably alternatingly, via two preferably pot-shaped output elements with two output shafts in coaxial arrangement to the input shafts. According to the invention, the input shaft which is rotatably mounted preferably directly or in immediate proximity in the region of a first end wall is guided up to the second end wall of the transmission housing located in opposition to the first end wall and is rotatably mounted there indirectly or indirectly via the output shafts which are also rotatably mounted in the region of the second end wall. As a result, the input shaft can be supported in housing planes that are arranged in clearly spaced-apart relationship and formed by the end walls. Particularly preferred is a configuration in which the input shaft is extended or guided beyond its output flange to the drive element of the clutches up to the second end wall. This results in a particularly durable support of the input shaft and the output shafts, which thus are prevented from exerting interfering reaction torques upon the clutch elements of the clutches, preferably multi-disk clutches, and are supported or mounted free of bending moment between the two end walls of the transmission housing and accordingly are able to transmit high driving torques. Advantageous refinements of the invention are the subject matter of the sub-claims.

As a result of the support which is free of bending moment, the presence of a wobbling motion and thus an unwanted clutch judder (creep bucking) is prevented.

This is achieved in particular with an embodiment in which an outer output shaft is rotatably mounted in the region of the end wall, in particular in the region of a bearing plane defined by this end wall or a bearing region defined by this end wall, on an inner output shaft which in turn is rotatably mounted on the input shaft. The bearings for the input shaft and the output shafts amongst one another and in the end walls are preferably formed by sturdy roller bearings, although the use of sliding bearings is in principle also possible.

It is further proposed to configure at least the two inner roller bearings between the input shaft and the inner output shaft, and between the inner and outer output shafts as needle bearings which require only little space in radial direction to thereby create a compact shaft assembly.

Furthermore, the two output elements of the multi-disk clutches can have tubular shaft stubs which are respectively connected in driving relationship with output shafts, formed as hollow shafts, via connections, in particular plug connections or splined plug connection, which are effective form fittingly in rotation direction, with a bearing, preferably a roller bearing, being provided in each region of the plug connections between the inner and outer output shafts, and with a bearing, preferably a roller bearing, being provided between the outer output shaft and the mentioned end wall of the transmission housing. This results in a particularly rigid inner support of the shafts relative to one another and in a very compact, easy to install shaft assembly in the clutch region. The two bearings are preferably roller bearings, especially preferred are flat needle bearings.

In addition, the shaft stub that is connected in driving relationship with the inner output shaft can be radially supported on the input shaft in the region of the output flange of the input shaft by a further bearing, preferably a roller bearing or needle bearings, and thrust bearings can be placed between the output flange of the input shaft and between annular flanges formed on the shaft stubs of the output elements, respectively. This ensures that any internal and external interfering torques that potentially act on the clutch elements are reliably absorbed by roller bearings both in radial and axial directions and a comfortable, smooth clutch function is promoted.

The lengthened portion of the input shaft can finally be formed as shaft extension either directly on the input shaft, or according to an alternative configuration, can be manufactured separately and firmly connected with the input shaft by a form fit and/or material joint.

BRIEF DESCRIPTION OF THE DRAWING

An exemplified embodiment of the invention will now be described in greater detail with further details and with reference to the attached drawing in which the sole

DETAILED DESCRIPTION OF PREFERRED EMBODIMENTS

Figure 1:
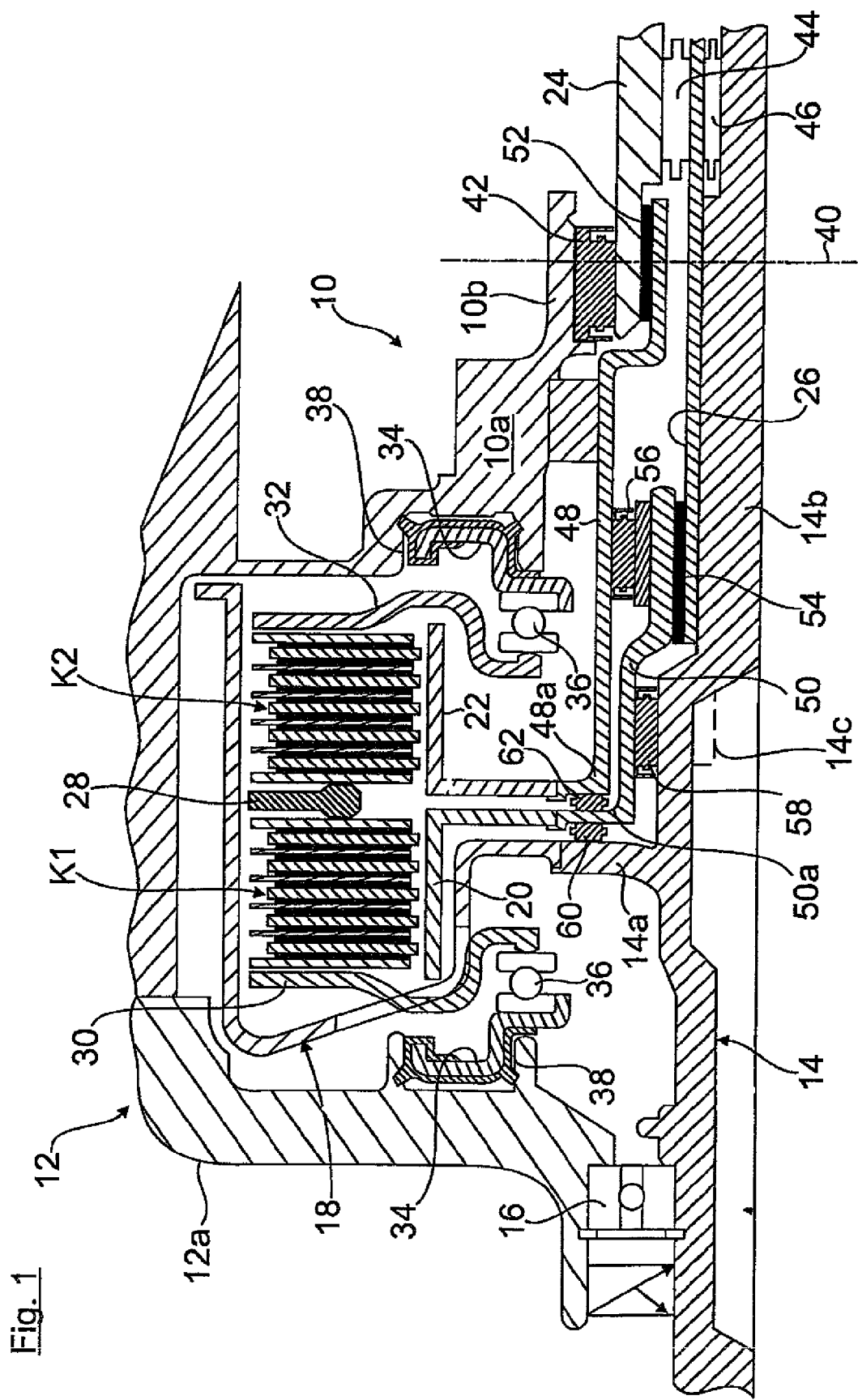
FIG. 1 shows a longitudinal section of half of a drive assembly of an only partially shown twin-clutch transmission for a motor vehicle.

The attached schematic drawing shows a longitudinal section of a half of a drive assembly of an only partially shown twin-clutch transmission for motor vehicles, including two multi-disk clutches K1, K2 having clutch elements connected in driving relationship with an input shaft and two output shafts, and rolling bearings which are provided in the enclosing transmission housing and in the shaft assembly.

The drawing shows an upper half of a section of a twin-clutch transmission for motor vehicles, having a multipart housing portion 12 which is attached to a transmission housing 10 (only indicated) and in which two hydraulically-actuated multi-disk clutches K1 and K2 are arranged as friction clutches.

An input shaft 14 is rotatably mounted in an input-side end wall 12a (or housing cover) of the housing portion 12 via a first roller bearing or a ball bearing 16 and introduces a defined drive torque from a not shown internal combustion engine (or another power source) to a drum-shaped drive element 18 which is open on one side and connected in driving relationship in a manner known per se with clutch disks of the two disk stacks of the multi-disk clutches K1 and K2.

Further clutch disks disposed between these clutch disks are connected in driving relationship with pot-shaped output elements 20, 22 which are in driving relationship with output hollow shafts 24, 26 of the twin-clutch transmission that are arranged in coaxial relation to the input shaft 14.

The two axially adjacent disk stacks of the multi-disk clutches K1, K2 are supported in midsection on a reaction member 28 and can be acted upon from both sides by axially movable compression plates 30, 32 which rotate conjointly with the drive element 18.

The multi-disk clutches K1, K2 are of conventional design unless described, with the disks being connected alternately to the outer drive element 18 and the inner output elements 20, 22 via axially oriented splines, so that the clutch K1 can be closed when acted upon by the compression plate 30 on the left-hand side of the drawing, and the clutch K2 can be closed when acted upon by the right-hand compression plate 32, to thereby enable the driving torque of the input shaft 14 to be transmitted to the output shaft 24 or the output shaft 26 of the twin-clutch transmission.

The compression device for the two clutches K1 and K2 is designated here as disengagement device and constitutes, in fact, an engagement device and is respectively comprised of an annular piston 34 and an engaging and disengaging bearing 36 arranged on the annular piston 34.

The annular pistons 34 are supported for axial displacement in bores 38 of the radial end walls 12a, 10a of the transmission housing 10, 12 and suitably sealed and can be acted upon hydraulically in a manner not shown.

The input shaft 14 and the two output shafts 24, 26 are roller-bearing mounted in the transmission housing 10, 12 as follows:

All three shafts 14, 24, 26 extend into a region of the end wall 10a of the transmission housing 10 and are rotatably mounted via roller bearings or needle bearings 42, 44, 46, with the input shaft 14 being rotatably mounted in the region of the end wall 10a indirectly via the output shafts 24, 26. The input shaft 14 is rotatably mounted in the output shaft 26 via the bearing 46 and the output shaft 26 is rotatably mounted in the output shaft 24 via the bearing 44 axially outwardly of the end wall 10a at its axial side facing away from the end wall 12a.

The radially outer, hollow output shaft 24 is hereby supported via the needle bearing 42 directly in the respective bearing neck 10b in the end wall 10a, while the radially inner output shaft 26 is indirectly supported via the needle bearing 44 within the outer output shaft 24.

Further, the radially inner input shaft 14 is lengthened by a shaft extension 14b so as to extend beyond the output flange 14a, which is connected in driving relationship to the drum-shaped drive element 18 of the multi-disk clutches K1, K2, in the direction of the end wall 10a, with the shaft extension being roller-bearing mounted by the third needle bearing 46 within the central output shaft 26 and also approximately in the common roller-bearing plane 40.

The driving connection of both output shafts 24, 26 is established via tubular shaft stubs 48, 50 which are connected to the pot-shaped output elements 20, 22 of the multi-disk clutches K1, K2 and are each connected form fittingly in rotation direction via splined plug connections 52, 54 (shown here by black lining) with the output shafts 24, 26.

The splined plug connection 52 provided between the radially outer shaft stub 48 and the output shaft 24 is again approximately in the region in the radial plane 40 of the end wall 10a of the transmission housing 10 and the mentioned needle bearings 42, 44, 46.

The shaft stub 48 is roller-bearing mounted on the shaft stub 50 via two further roller bearings or needle bearings 56, 58 in axially offset relationship, and the shaft stub 50 is roller-bearing mounted on the shaft extension 14b of the input shaft 14 so that a rigid shaft assembly is created which is free of bending moment.

As can be seen, the needle bearing 56 is positioned in a radial plane with the plug connection 54 between the shaft stub 50 and the inner output shaft 26, whereas the needle bearing 58 is arranged near the output flange 14a on the input shaft 14.

The shaft stubs 48, 50 are additionally supported in axial direction upon the output flange 14a of the input shaft 14 by annular flanges 48a, 50a, which are formed on the shaft stubs 48, 50, and by thrust bearings 60, 62.

Unlike in the exemplified embodiment, the shaft extension 14b of the input shaft 14 may also be constructed as a composite and placed, for example telescopically as shown in dashed lines, with a projection 14c in the hollow input shaft 14 and firmly connected with the latter by way of a low-distortion welding process (e.g. laser welding or friction welding).

As can be seen from the drawing, the input shaft 14 with the shaft extension 14b is rigidly supported by the roller bearing 16 directly on the end wall 12a of the housing portion 12 and by the needle bearing 46 indirectly via further needle bearings 44, 42 in the second end wall 10a of the transmission housing 10, 12, with the shaft assembly 14, 24, 26 being stabilized by the further needle bearings 56, 58 and the thrust bearings 60, 62 in such a manner as to prevent potentially interfering moments from the adjacent transmission elements, for example as a result of shaft deflections encountered at high loads, from acting upon the input shaft 14 and/or the output shafts 24, 26 and to ensure a trouble-free clutch operation of both multi-disk clutches K1, K2.

The solution according to the invention results in a unique support of the input shaft and drive shaft 14 in the housing planes (in the plane 10a indirectly via the bearings 42, 44 and 46) formed by the end walls 10a, 12a.

The invention claimed is:

1. Drive assembly for a twin-clutch transmission for motor vehicles, comprising two clutches which are axially connected in succession in a transmission housing and are positioned between spaced-apart end walls of the transmission housing and which have a drive element which is driven by an input shaft of the transmission, with the clutches being in driving relationship via two output elements, with two output shafts in coaxial arrangement to the input shaft, wherein the input shaft which is rotatably mounted in a region of a first one of the end walls is sized to extend into a region of a second one of the end walls located in opposition to the first end wall and is rotatably mounted indirectly via the output shafts which are also rotatably mounted in the region of the second end wall, wherein the input shaft is rotatably mounted in an inner one of the output shafts and the inner output shaft is rotatably mounted in an outer one of the output shafts axially outside of the second end wall at its axial side facing away from the first end wall.

2. Drive assembly according to claim 1, wherein the input shaft has an output flange which is connected to the drive element and the input shaft is sized to extend up to the second end wall.

3. Drive assembly according to claim 1, further comprising bearings for support of the input shaft and the output shafts amongst each other and in the end walls, said bearings being formed by roller bearings.

4. Drive assembly according to claim 3, wherein at least two of the bearings are inner bearings which are configured as needle bearings between the input shaft and the inner one of the output shafts and between the inner output shaft and the outer one of the output shafts.

5. Drive assembly according to claim 1, wherein the two output elements have tubular shaft stubs which are respectively connected in driving relationship with the output shafts, via connections which act formfittingly in rotation direction.

6. Drive assembly according to claim 5, further comprising a first bearing provided in a region of one of the connections between the shaft stubs, and a second bearing provided between the outer output shaft and the second end wall of the transmission housing.

7. Drive assembly according to claim 6, wherein the first and second bearings are formed by needle bearings.

8. Drive assembly according to claim 6, wherein the shaft stub of one of the output elements is connected in driving relationship with the inner output shaft and is radially supported on the input shaft in proximity of an output flange of the input shaft via third bearing.

9. Drive assembly according to claim 5, further comprising thrust bearings placed between an output flange of the input shaft and between annular flanges formed on the shaft stubs of the output elements, respectively.

10. Drive assembly according to claim 1, wherein the input shaft is made in one of two ways, a first way in which the input shaft is made in one piece, said input shaft having an output flange connected to the drive element and a shaft extension sized to extend beyond the output flange and formed directly on the input shaft, a second way in which the input shaft is made of several parts and has a separate shaft extension sized to extend beyond an output flange to the drive element and firmly connected with the input shaft by formfit or material joint.

11. Drive assembly according to claim 1, wherein the drive element has a drum-shaped configuration.

12. Drive assembly according to claim 1, wherein the output elements have a pot-shaped configuration.

13. Drive assembly of claim 1, wherein the output elements are in driving relationship to the output shafts.

14. Drive assembly according to claim 5, wherein the connections are plug connections or splined plug connections.

15. Drive assembly according to claim 8, wherein the first, second and third bearings are each a roller bearing.

16. Drive assembly for a twin-clutch transmission for a motor vehicle, comprising:
- an input shaft rotatably supported by a first end wall of a transmission housing and sized to extend into a region of a second end wall of the transmission housing in opposition to the first end wall;
- a drive element driven by the input shaft and operably connected to two clutches of the twin-clutch transmission in one-to-one correspondence;
- two output shafts arranged in coaxial arrangement to the input shaft and indirectly rotatably supporting the input shaft in the region of the second end wall; and
- two output elements in driving relationship with the output shafts,
- wherein the input shaft is rotatably mounted in an inner one of the output shafts and the inner output shaft is rotatably mounted in an outer one of the output shafts axially outside of the second end wall at its axial side facing away from the first end wall.

* * * * *